Aug. 26, 1941.   M. LEHMAN   2,253,906
METAL BEAD BENDER
Filed Jan. 11, 1940
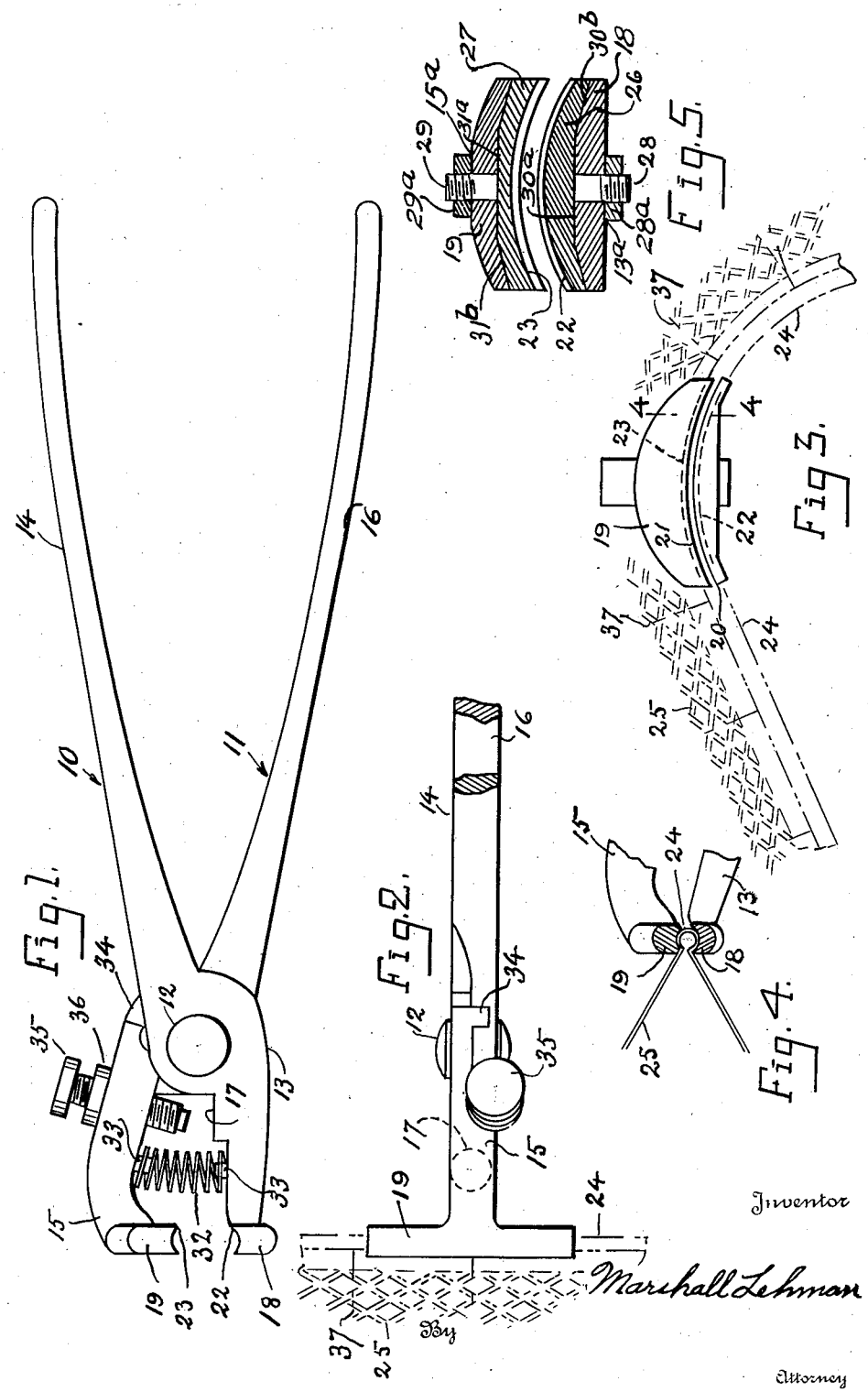

Patented Aug. 26, 1941

2,253,906

UNITED STATES PATENT OFFICE 2,253,906

METAL BEAD BENDER

Marshall Lehman, Silver Spring, Md.

Application January 11, 1940, Serial No. 313,454

1 Claim. (Cl. 81—15)

My invention relates to a tool for curving or bending metal wires, strips or the like, or articles having a rolled edge or bead and it relates more particularly to such articles as perforated or grilled angle shapes with a central bead as are used for reinforcing wall corners over which plastering is to be applied. These beaded metal strips or shapes are generally supplied in straight lengths and have to be cut and bent to a desired curvature when used for the corners of arched doorways and windows or the like. This is a difficult procedure when even and uniform arches are desired. In order to facilitate this work my tool is provided and, from extensive tests, it has proved itself to be very efficient and accurate as well as greatly time saving.

My hand-operated tool has the general character and form of a pair of pliers or tongs, consisting of two levers hinged together near one end on a pin or pivot, the long arms constituting the handles and the short arms provided with transverse jaws, constituting the grippers or bending elements.

In the accompanying drawing one embodiment of my invention is illustrated and

Fig. 1 shows a side view of the device with the jaws open;

Fig. 2 is a fragmentary top plan view of Fig. 1;

Fig. 3 is a front end view of Fig. 1 with the jaws closed over the grilled beaded shape or strip;

Fig. 4 is a vertical section on line 4—4 of Fig. 3 and

Fig. 5 a modified form of the device with removable jaws in transverse, vertical section.

This tool consists of two levers 10 and 11 hinged together by a pivot pin 12, the lever 10 having a short, forward arm 13 and a long rearward shank 14; the lever 11 having a forward arm 15 and a long rearward shank 16. The shanks 14 and 16 constitute the handles and the forward arms 13 and 15 constitute the pincers or grippers.

At the free ends of the forward arms 13 and 15 are provided the respective jaws 18 and 19 in juxtaposition facing each other and preferably extending transversely to the forward arms, that is parallel to the axis of the pivot pin 12. These jaws have their adjacent edges made arcuate, one of them, preferably the lower one 18 forming the male member, as shown at 20, Fig. 3, while the upper jaw 19 forms the female member as at 21. Along the curved edges of the jaws are provided opposing rounded grooves 22 and 23 respectively, which together constitute the gripping portions of the jaws embracing the bead 24 of the strip or metal shape 25. The jaws 18 and 19 may form integral parts of the arms 13 and 15 as in Figs. 1 and 4, or they may be made as separate units 26 and 27, which jaw-units are secured in any suitable manner on the transverse ends 18 and 19 of the arms 13 and 15, as indicated in Fig. 5, as for instance by threaded bolts 28 and 29 and nuts 28a and 29a. In Fig. 5 these detachable jaws 26 and 27 are prevented from turning in their respective seats by the surfaces provided on said jaws and corresponding parts on the ends 18, 19 of the arms 13 and 15. On the lower arm 13 is thus shown in Fig. 5 a seat having a central, flat, horizontal surface 30a with thereto inclined, parallel end surfaces 30b, and on the upper arm 15, a seat having a central flat, horizontal surface 31a with inclined, parallel end surfaces 31b. The corresponding adjacent portions of the jaws 26 and 27 are shaped to fit snugly in their seats thereby preventing turning when the nuts 28a and 29a are drawn up tightly on their respective bolts 28 and 29 against the flattened surfaces 13a and 15a on the arms 13 and 15.

Several pairs or sets of these detachable jaws may be provided each set having grooves curved on different radii to suit the desired curvatures of the arched doorways or windows.

Between the arms 13 and 15 is inserted a compression spring 32 adapted to keep the jaws in open position ready for insertion of the work piece or in this case the bead 24 of the metal shape or strip. The spring may be retained in working position by a pair of short studs 33 provided opposite each other in the arms 13 and 15. At 34 on the upper arm is shown a small lug adapted to engage the top surface of shank 14 in order to counteract the force of the spring 32 and limit the gap between the jaws when open to receive the work piece.

One of the arms, the upper one 15 as here shown in Figs. 1 and 2, is provided with a stop screw 35 and clamping nut 36 for the purpose of limiting the opening between the jaws 18 and 19 in their working or closing position, so that the bead 24 may be compressed just enough and no more during the bending operation. The opposite arm, in this case 13, has an offset shoulder or abutment seat 17 against which the tit of the screw 35 strikes when the jaws are compressed in action.

It should be noted that the grilled sides or wings 25 of the angle shape or strip are slit crossways as at 37 towards the bead 24 to relieve the strain and to facilitate the bending or curving thereof. After bending of the strip, the grilled sides 25 will have the edges of the slits opened into a V as shown at 37 to the right of Fig. 3.

The operation of this tool is the following: After adjusting the stop screw to limit the grip of the jaws 18 and 19, the operator takes hold of the grilled angle shape 35 with one hand so that the bead 24 faces the open jaws while holding the tool handles 14 and 16 in his other hand in open position as in Fig. 1. The bead 24 which is now straight, is thereupon inserted between the open jaws 18 and 19, see Figs. 1 and 2. Then the operator draws the shanks 14 and 16 together until the tit of the screw 35 contacts with the shoulder 17, thereby limiting the movement. During this operation the straight bead 24 as at the left of Fig. 3 has been bent to a uniform arc between the jaws 18 and 19 to conform to the curvature of the grooves 22 and 23 in said figure and will now appear as at the right side of said figure with the desired curvature and with the slits 37 of the grilled wings spread open, forming a V as indicated.

By fully compressing the jaws 18 and 19 the beads will be bent to an arc of small radius, but with less compression a flatter arc may be obtained. It will be evident that the same result can also be gained by the use of exchangeable jaws 27 and 26 with each set of jaws curved to a different radius, see Fig. 5. By reversing the tool it will be understood that it can also be used for straightening out a curved portion of the bead.

It will be evident that many modifications in the construction and arrangement of the parts may be made in this tool within the scope of the claim.

What I claim is:

A tool for producing a bend on beaded shapes and the like, comprising a pair of levers, a pivot pin jointing the levers together so as to form operating handles on one side and arms on the other side thereof, each of said arms having a transversely arranged free end part provided with a seat, said seat comprising a flat central portion and side portions inclined with respect to said central portion, a pair of opposing jaw members provided with arcuate and grooved work engaging surfaces of which one is male and the other female for producing said bend, the jaw members each having a flat central portion and inclined side portions corresponding to the flat and inclined portions of the seats in the arms, and means including apertures and bolts in said end parts and jaw members for removably securing said jaw members in their seats.

MARSHALL LEHMAN.